Oct. 22, 1946.  A. W. MALL ET AL  2,409,775
CHAIN-SAW MACHINE
Filed March 24, 1942  5 Sheets-Sheet 1
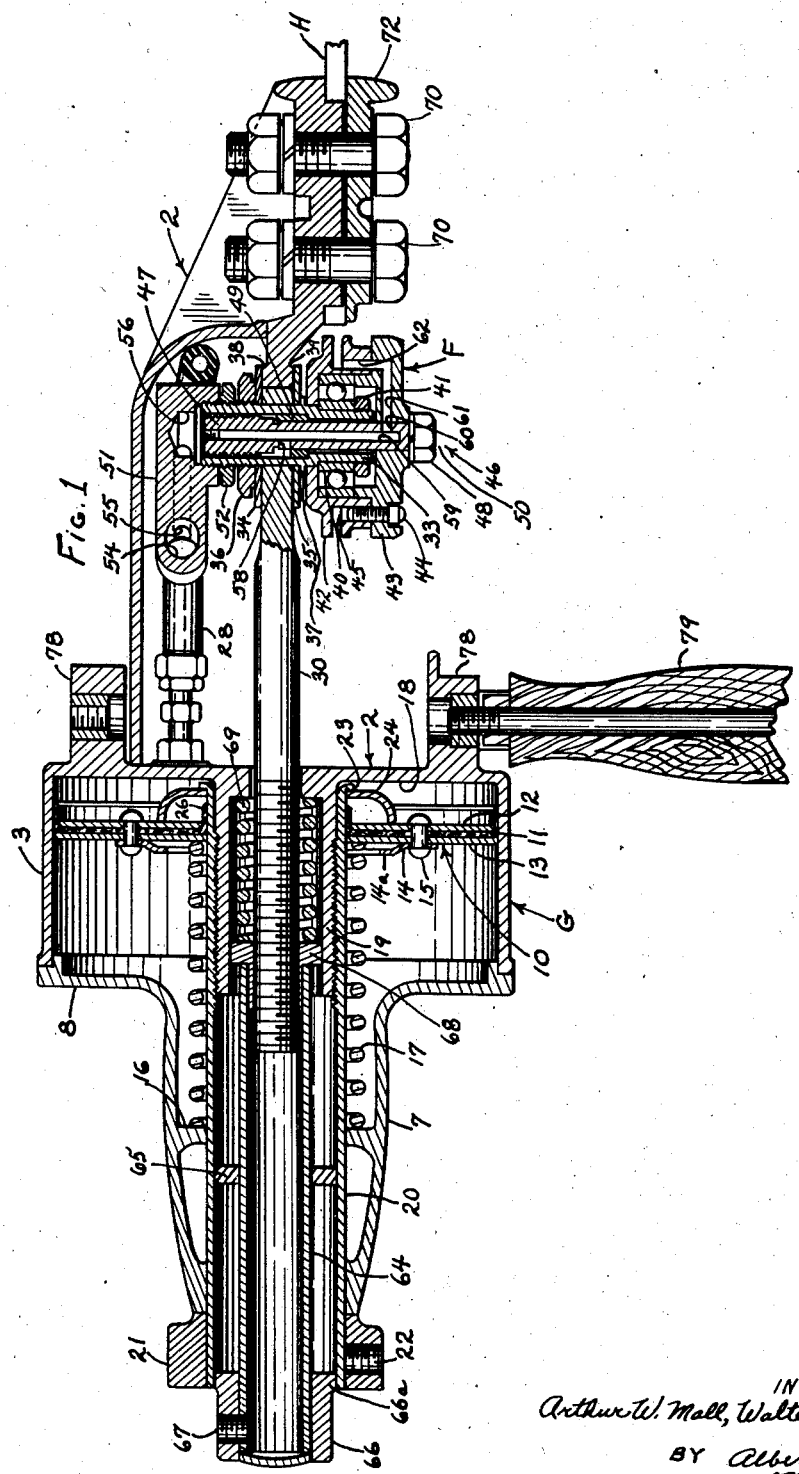
INVENTORS
Arthur W. Mall, Walter L. Gorden
BY Albert Latta
ATTORNEY

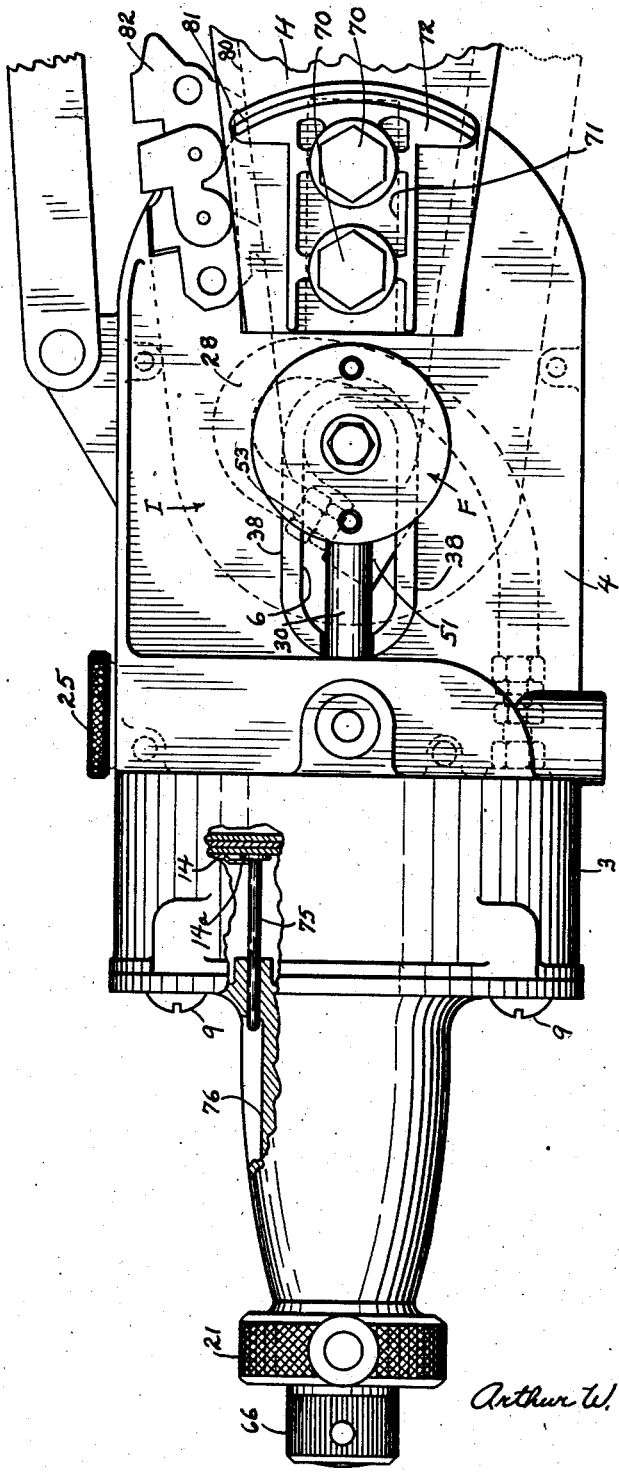

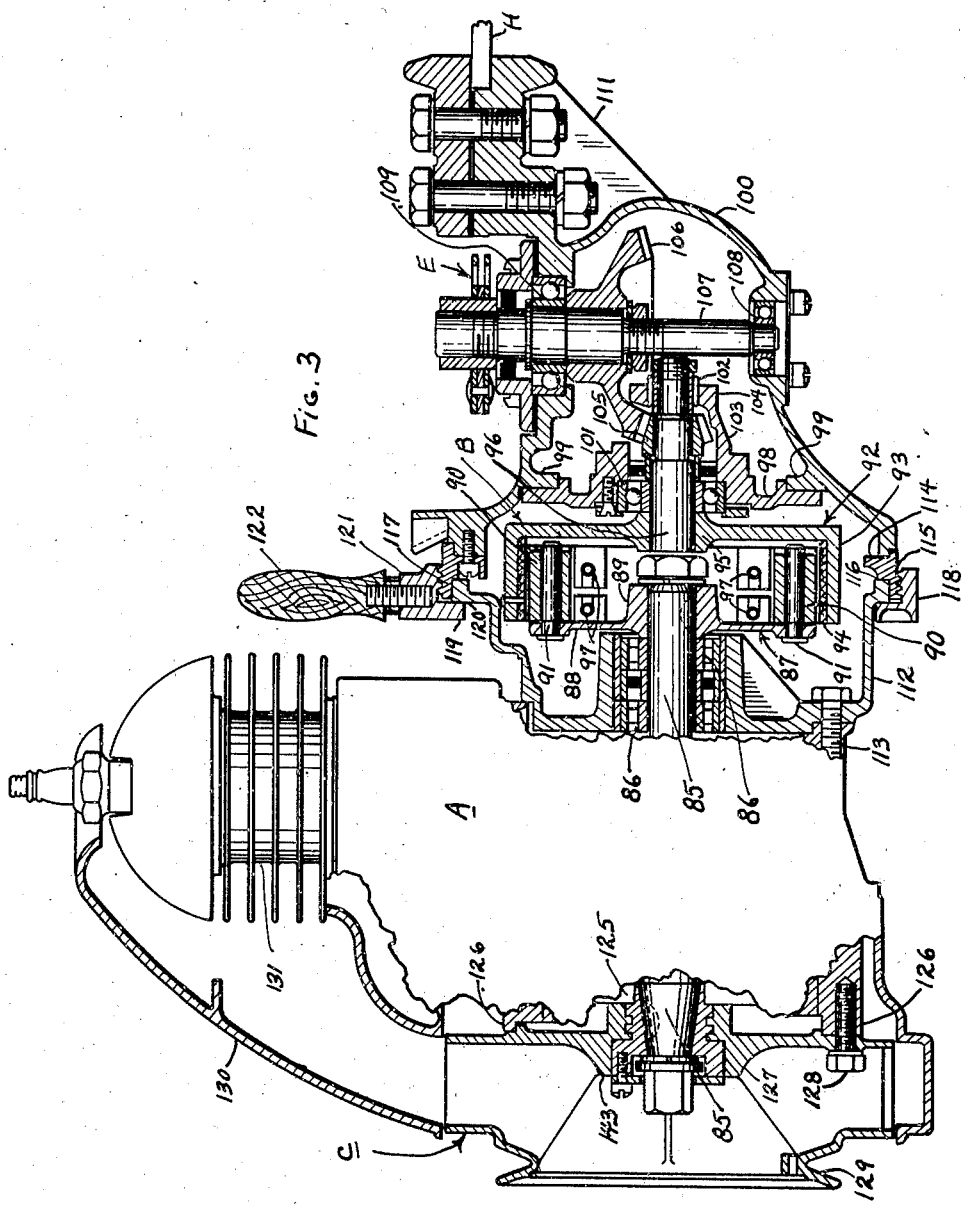

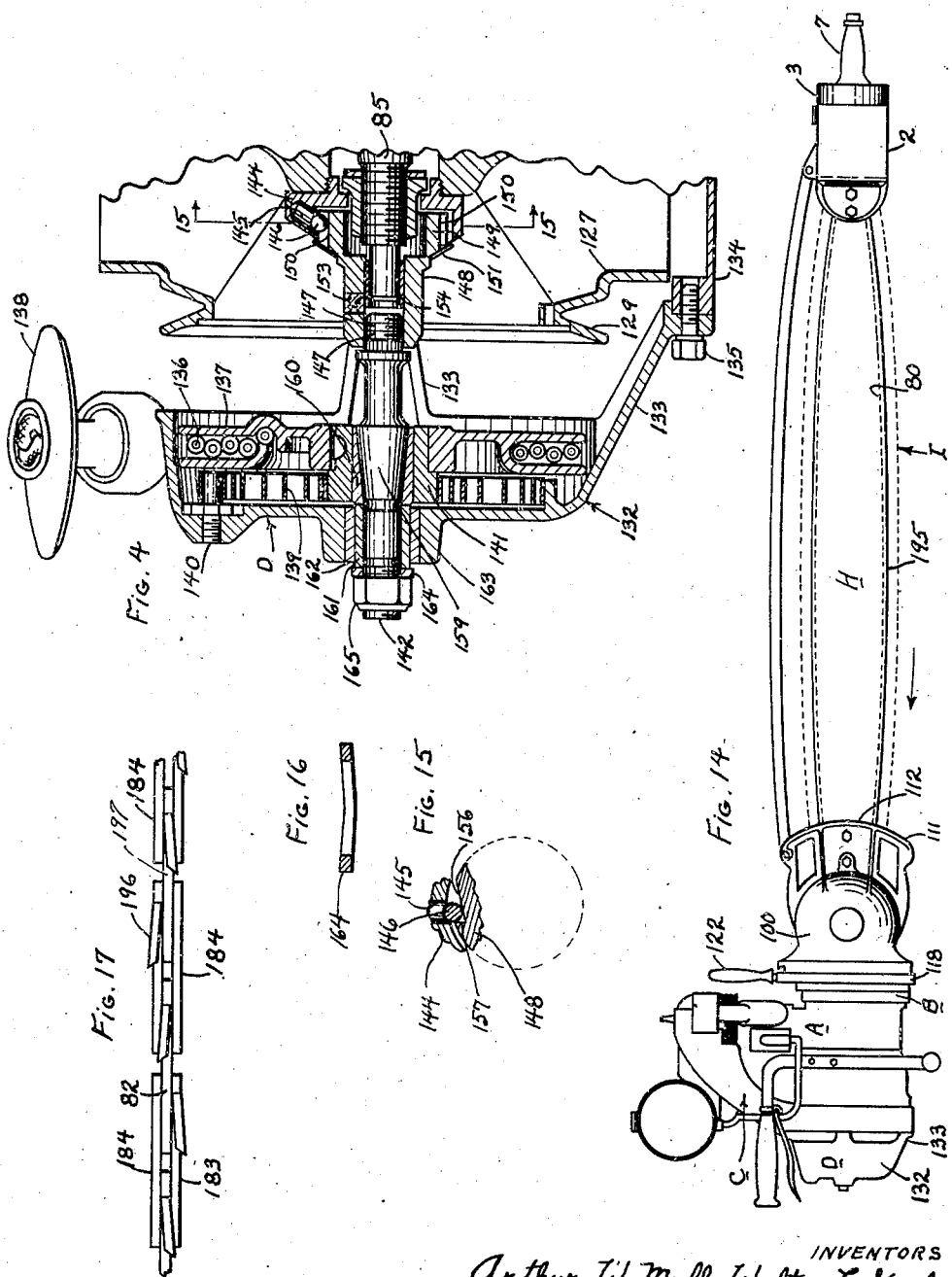

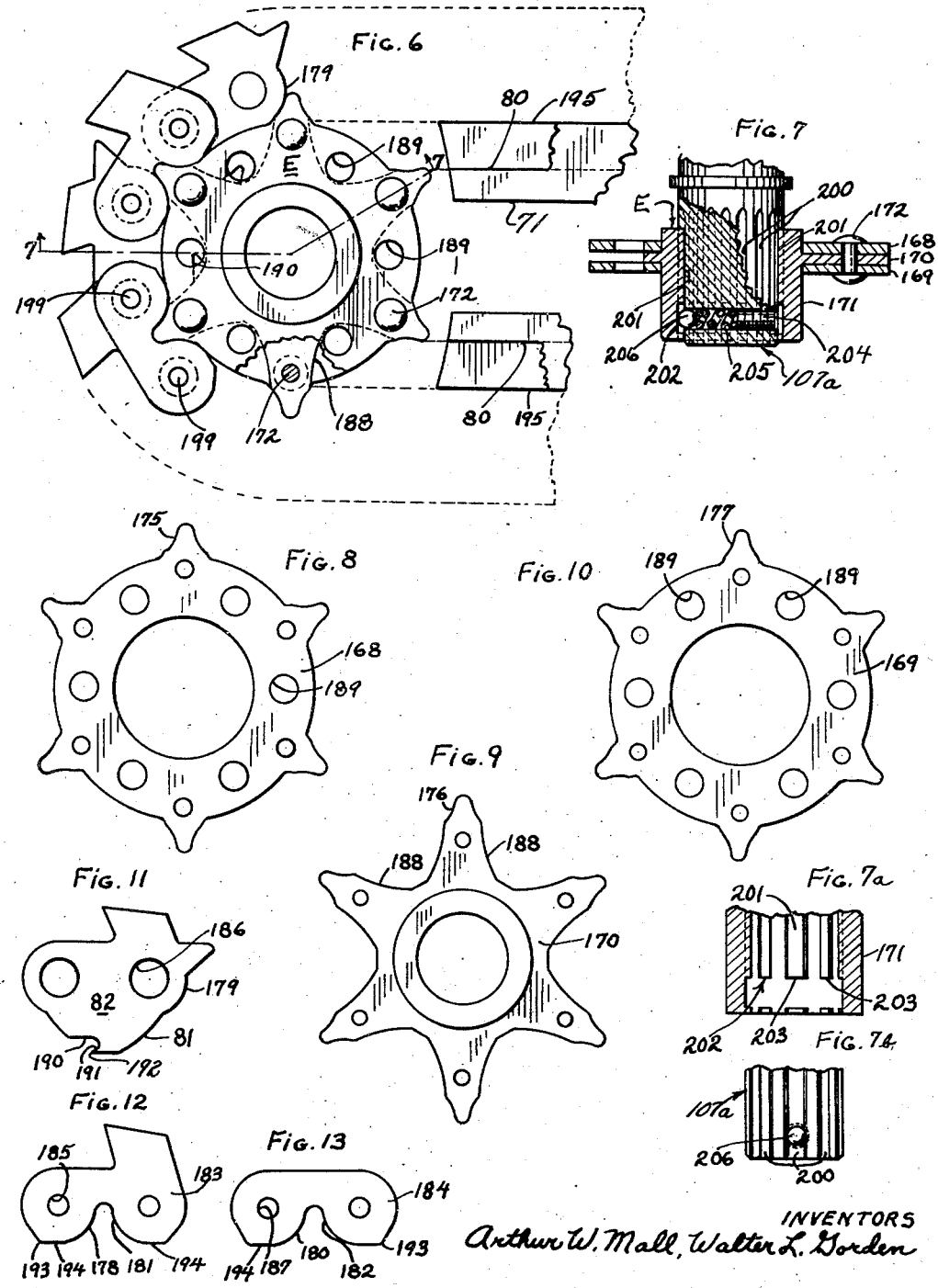

Patented Oct. 22, 1946

2,409,775

UNITED STATES PATENT OFFICE 2,409,775

CHAIN-SAW MACHINE

Arthur William Mall, Flossmoor, and Walter L. Gorden, Chicago, Ill.

Application March 24, 1942, Serial No. 436,014

7 Claims. (Cl. 143—32)

1

Our invention relates to portable power driven link-toothed woodcutting saws, commonly referred to as chain saw machines. A saw of this type may be used for numerous purposes, such as cutting down standing trees, bucking trees which have been felled and cutting piling and railroad ties.

A primary object of our invention is to provide a saw which will meet the requirements of an all-purpose saw. In connection with this, one of our objectives is to provide a means for driving the saw chain which means makes possible a reduced diameter of the driving sprocket. By reducing the diameter of the driving sprocket, we are able to reduce the width of the saw chain guide plate, which is desirable when felling a tree.

Another object of our invention is to provide an automatic lubrication system which will lubricate the saw chain in any position and which lubricates the saw chain only while the saw is operating.

Another object is to provide combined means for swiveling the cutting end of the saw relative to the motor and for detaching the cutting end of the saw from the motor.

A still further object is to provide an automatic transmission of a type which permits a larger gear reduction ratio and a consequent reduction of chain speed.

A further object is to provide means for preventing lubricant-soaked saw dust from clogging in the chain groove in the saw chain guide plate.

A further object is to provide a saw tooth having a flattened portion for riding on the tracks in the guide plate; thereby assuring longer wearing life.

A further object is to provide means for disposing of the sawdust to prevent clogging in the sprocket.

A further object is to provide an engine starting device which will become automatically disengaged from the engine shaft in event the engine backfires. A further object is provide a quickly detachable driving sprocket which is self-aligning with the groove in the guide plate. Other objects and advantages will become apparent upon reading the following description and upon examination of the drawings in which:

Fig. 1 is a sectional view of that end of the sawing machine remote from the motor;

Fig. 2 is a side view of the same end of the sawing machine;

Fig. 3 is a sectional view of the motor end of

2 the sawing machine with the gasoline engine shown diagrammatically;

Fig. 4 is a sectional view of the engine starting device;

Fig. 5 is a view of the chain tensioning rod;

Fig. 6 is a fragmentary view showing the driving sprocket and cutting teeth and one end of the chain guide plate;

Fig. 7 is a sectional view of the driving sprocket taken on line 7—7 of Figure 6 and showing a modified form of sprocket and sprocket shaft;

Fig. 7a is a fragmentary sectional view showing the interior of the sprocket hub shown in Fig. 7;

Fig. 7b is another fragmentary view of the sprocket shaft shown in Figure 7;

Figs. 8, 9 and 10, show the driving sprocket separated into its three complementary parts;

Figs. 11, 12 and 13 show the three types of teeth which make up the cutting chain;

Fig. 14 is a side elevational view showing the sawing machine as a unit;

Fig. 15 is a sectional view taken on line 15—15 of Fig. 4;

Fig. 16 is an enlarged sectional view of the spring washer shown in Fig. 4; and

Fig. 17 is a fragmentary diagrammatic view showing the sequence of the cutting chain teeth.

In the preferred embodiment of our invention we have shown generally a chain sawing machine comprised of a power unit A, an automatic transmission assembly B, a cooling system C, an engine starting device D, a driving sprocket E, an idling sprocket F, a lubrication chamber G, and a guide plate H for the cutting chain I.

Referring to Figs. 1 and 2, we have shown one important feature of our invention consisting of a combined lubricating and chain tensioning assemblage. In a link toothed sawing machine of the type shown, it is essential that the cutting teeth, sprockets and guide plate groove be lubricated at all times.

We have provided a lubricating device which supplies a continuous trickle of lubricant into the driving sprocket while the machine is operating and which lubricant supply is cut off automatically the moment the machine stops running.

A casting 2 is formed with a cylindrical portion 3 which forms a reservoir for the lubricant. Extending outwardly from the cylindrical portion 3 is a wall portion 4, (best shown in Fig. 2), which is preferably formed as an integral part of casting 2. This wall portion 4 serves to support one end of the guide plate H. This wall portion 4 is also provided with an elongated slot 6, the function of which will be hereinafter described.

A handle 7 is provided at one end of casting 2 with a radially outwardly extending circular disk-like portion 8, which serves as a cover for the oil reservoir and is secured thereto by means of screws 9. Enclosed within the lubricant reservoir 3 is a plunger assembly 10 comprised of a leather cup washer 11, a pair of metallic stiffening disks 12 and 13 mounted on opposite sides of the cup member and a third disk 14 having an outwardly extending annular lip 14a, the function of which will be hereinafter described. Rivets 15 secure the leather cup and disks together as a unitary plunger 10. An annular flange 16 formed in the interior of handle 7 serves as a retainer stop for compression spring 17. The compression spring 17 is at all times normally urging the plunger 10 in a direction away from the handle so that the lubricant contained in the reservoir is at all times under pressure urging it to flow in the direction of the sprocket F. The lubricant is contained in that portion of the reservoir designated by numeral 18 and in Figs. 1 and 2 the plunger is shown in a position wherein the reservoir is almost emptied of its lubricant.

Extending into the interior of the reservoir 3 is an externally threaded shaft portion 19 which is preferably formed integrally with casting 2. An elongated sleeve 20 extends through the interior of handle 7 and screwthreadedly engages the shaft portion 19. Sleeve 20 is rotatably and longitudinally movable relative to handle 7. A hand gripping knob 21 is secured to the end of sleeve 20 by means of a set screw 22. The inner end of knob 21 normally abuts the outer end of handle 7. The inner end of sleeve 20 is formed with a radially outwardly extending annular lip 23. A cup washer 24 is provided with a central aperture for receiving sleeve 20 and is abutted at its inner periphery by the lip 23 and at its outer periphery by plunger 10.

Thus, when it is desired to refill the lubricant reservoir 3 this is accomplished by removing the oil cap 25; then turning knob 21 counter-clockwise. Upon turning knob 21 counter-clockwise, sleeve 20 moves longitudinally in a direction away from the driving sprocket as a result of its screw-threaded engagement with shaft portion 19. Likewise, the plunger 10 is moved in the same direction as sleeve 20 due to the lip 23 which engages the cup washer 24, which in turn engages plunger 10. The function of cup washer 24 is to prevent lip 23 from coming into contact with the inner periphery 26 of the leather cup washer 11.

As the knob 21 is turned counter-clockwise, the plunger 10 is retracted against the compression of spring 17 until it assumes a position at the opposite end of the reservoir from the position shown in Figs. 1 and 2. The lubricant is then poured into the reservoir and cap 25 is replaced. Knob 21 is then turned in a clockwise direction until sleeve 20 is screwed all of the way onto shaft 19 as shown in Figs. 1 and 2. The plunger 10, however, remains in its retracted position due to the uncompressibility of the lubricant in the reservoir. The lubricant travels from the reservoir 3 through a flexible conduit 28 which has a connection with an oil passage leading through the sprocket F. The reason for the flexible conduit 28 will be hereinafter described. Sprocket F is an idler sprocket and is supported primarily by rod 30. The rod 30 has a flattened portion 31 at one end which is provided with a hole 32 as best shown in Figure 5. The idler sprocket is mounted on a stationary hollow shaft 33 which shaft is received in the bore 32 in rod 30. The shaft 33 is firmly secured in a fixed position relative to rod 30 by means of a pair of conventional steel washers 34 and 35, which washers are tightly secured against opposite faces of the flattened portion 31 of rod 30 by means of nut 36 and the annular flange 37. The diameters of the washers are greater than the width of the flattened portion 31 as shown diagrammatically in Figure 5, so that the peripheral region of the washers extends beyond the edges of the flattened portion 31 of rod 30. The overlapping portions of washers 34 and 35 ride upon the oval shaped tracks 38 and 39. Track 38 is shown in Figure 2 and is preferably formed integrally with the wall portion 4 of casting 2. Track 39 is on the underneath side of the wall 4 (viewing Figure 2) and coincides with track 38. One end of track 39 is shown in Figure 1.

The thickness of wall 4 measured in the region of tracks 38 and 39 is a few thousandths of an inch less than the thickness of flattened portion 31 of rod 30, whereupon washers 34 and 35 are spaced apart from each other sufficiently far to permit sliding movement relative to tracks 38 and 39. Thus, when it is desired to adjust the tension of cutting chain I, rod 30 may be moved longitudinally within the limits of slot 6.

At the lower end of shaft 33 an anti-friction bearing 40 is mounted and is secured in place by nut 41. The rotative portion of idler sprocket F is comprised of a pair of circular disk-like members 42 and 43 secured together by means of screws 44. The upper member 42 is provided with an annular groove 45 in which the teeth of the cutting chain ride. The interior of upper member 42 provides a bearing retainer for bearing 40. The lower member serves to support the oil pump 46. The oil pump is comprised of a shaft member 50 having a threaded nipple 47 at its upper end. The lower end is received in a bore in member 43 and is securely fastened to member 43 by means of nut 48 so as to be rotatable therewith. A sleeve type bearing 49 is mounted within shaft 33 and provides bearing means for shaft member 50.

An L-shaped fitting 51 is threaded onto the upper end of shaft member 33 and is locked in place by lock nut 52. The flexible conduit 28 is fastened to the fitting 51 by means of nuts 53 (shown in Figure 2). The fitting 51 is provided with a passage 54 which registers with a second passage 55, which opens into bore 56. Thus it can be seen that the oil from reservoir 3 passes through the flexible conduit 28 into passage 54 then through passage 55 into bore 56.

When the sawing machine is started up, the idler sprocket F is caused to rotate due to the cutting chain traveling in groove 45 and as the sprocket starts to rotate, the oil pump shaft 50 also rotates. The rotation of the threaded nipple 47 causes the oil in bore 56 to commence to trickle along the thread grooves of the threaded nipple until it reaches the small chamber immediately below nipple 47. The oil then proceeds through an opening 58 in the wall of shaft 50 and thence into passage 59 which extends axially through the oil pump shaft 50. The oil then passes through another opening 60 in the wall of shaft 50, which opening registers with a passage 61 which extends through sprocket member 43. Passage 61 registers with passage 62 in sprocket member 42 and passage 62 opens into the bottom of groove 45.

The oil is thus conveyed to cutting chain I, thoroughly lubricating the entire chain. When the sawing machine is not operating, the oil remains in opening 56 and is substantially prevented from trickling past the threaded nipple 47 due to the non-rotation of said nipple. Thus it can be seen that we have provided a lubricating system which assures a steady trickle of oil to the cutting chain while the machine is operating regardless of what position the machine may be in and when the machine is not operating the flow of lubricant to the cutting chain is cut off. We have also provided a means for adjusting the tension of the cutting chain. Rotatably and slidably disposed within sleeve 20 is a second sleeve 64 which receives its bearing support partly from ring 65 which is secured within sleeve 20 by a pressed fit and partly from the periphery of the annular flange 66—a at the inner end of knob 66. The knob 66 is secured to sleeve 64 by set screw 67.

The threaded end of rod 30 receives a nut member 68 which is secured by a pressed fit into the inner end of sleeve 64 so as to be rotatable therewith.

A compression spring 69 continuously urges sleeve 64 in an outwardly direction, thereby causing rod 30 and sprocket F to move in the same direction and thereby causing the cutting chain I to be under a constant resilient tension. The amount of tension on the cutting chain may be increased or decreased by simply turning knob 66. The flexible oil conduit 28 permits movement of the rod 30, sprocket F and fitting 51, relative to casting 2. The tension of the cutting chain is first (roughly) adjusted by loosening bolts 70 and manually moving the casting 2 relative to guide plate H and then retightening said bolts. The guide plate H is provided with an elongated slot 71 (shown in Figure 6 and in dotted lines in Figure 2). A removable bracket clamp 72 securely clamps the guide plate in a fixed position relative to casting 2 when bolts 70 are tightened.

In order to know when to refill the oil reservoir, we have provided a measuring indicator rod 75 which is journaled in a hole drilled through the inner end of handle 7. Handle 7 is also provided with a slot 76 into which rod 75 can travel. When the reservoir is empty, the free end of rod 75 is in the position shown in Figure 2. The rod is provided at one end with a head which is engaged by the lip 14a of disk member 14. Thus the indicator rod is secured to plunger 10 so as to move therewith at all times.

Casting 2 may be provided with a number of bosses 78 so that handle 79 can be inserted in any one of them. Referring to Figure 14, we have shown the cutting chain I in dotted lines and the chain groove 80 in guide plate H is also shown in dotted lines. The depending tongue 81 of chain tooth 82 rides in the groove 80. See Fig. 11. Referring to Figure 3, we have provided an automatic transmission system designated generally as B, whereby the stopping and starting of the cutting chain is automatically controlled according to the speed of the engine A, and the torque transmitted through the clutch.

Extending outwardly from engine A is the engine shaft 85 supported in roller bearings 86. At the end of shaft 85 clutch member 87 is secured thereto so as to be rotatable therewith. Clutch member 87 is comprised of a disk member 88 having a centrally bored hub 89 which is keyed to engine shaft 85.

A pair of centrifugally actuated clutch shoes 90 are pivotally mounted on disk 88 by means of pins 91. Driven clutch member 92 includes a cylindrical cup-like member 93 having a clutch lining 94 pinned to the interior thereof. A centrally bored hub 95 receives the end of shaft 96 and is keyed thereto. The clutch is of the centrifugal type, clutch shoes 90 overcoming tension of springs 97 when the speed of engine shaft 85 reaches a certain R. P. M., said clutch shoes engaging clutch lining 94 and imparting rotation to shaft 96. It is to be noted that clutch member 92 is supported on a shaft separate from the engine shaft, shaft 96 being supported by a cross wall 98 which is secured by means of screws or other fastening means to an annular shoulder 99 preferably formed integrally with the gear housing 100.

Shaft 96 is supported in anti-friction bearings 101 and 102, bearing 102 being of the needle type. Cross wall 98 has an outwardly extending arm 103 which has a hub 104 receiving one end of shaft 96. Bevel gear 105 meshes with gear 106 to transmit rotation to sprocket E at a reduced speed. Gear 106 is supported on sprocket shaft 107, which is supported in anti-friction bearings 108 and 109. Driving sprocket E may be secured to sprocket shaft 107 by being threaded thereonto.

Gear housing 100 has a bracket member 111 extending therefrom which is rounded at its outer end 112 so as to prevent any tendency of jamming when cutting through a log. It will be noted that the cutting chain I travels in the direction indicated by the arrow in Fig. 14 and therefore when a log or tree is being cut, the log rides against surface 112 during the cutting thereof.

One important objective which we have sought to accomplish, is to cut down the over-all weight of the sawing machine to a minimum without decreasing its horsepower output. This is accomplished partly by securing the driving member of the clutch onto the engine shaft and by supporting the driven member of the clutch on a separate shaft as hereinbefore described.

This arrangement permits the use of a clutch having a smaller diameter for the reason that the clutch driving member 87 rotates at the same R. P. M. as the engine shaft, which speed is several times greater than the speed of sprocket shaft 107, thereby imparting greater centrifugal force to clutch shoes 90 and therefore increased clutching action. Likewise, the torque load on the clutch is reduced as a result of the speed reduction gears 105 and 106, consequently requiring less clutching capacity.

In a portable chain sawing machine, it is necessary that the saw be capable of operating in any position, consequently, when a gasoline engine is used as the power unit, it is necessary to adjust the cutting chain I and guide plate H, relative to the engine. We have provided an adjusting device which can also be used to separate the gasoline engine from the remainder of the sawing machine. Referring to Figure 3, we have provided a clutch housing 112, which is secured to the main engine housing by means of bolts 113. Secured to gear housing 100 is an annular bronze ring 114 having external threads 115. This ring 114 has a radially inwardly extending annular shoulder 116 which normally abuts the end of clutch housing 112 and an axially extending circular flange 117 encircling the end of housing 112 so as to be rotatable relative thereto.

A second annular bronze ring 118 screw-threadedly engages the ring 114. Said second ring 118 has a radially inwardly extending annular flange 119 normally abutting the circumferential face 120 of clutch housing 112. A plurality of bosses 121 are formed in the annular ring 118 so as to provide threaded sockets for receiving handles 122.

Thus, it can be seen that when it is desirable to transport the sawing machine from one locality to another, the ring 118 can be turned counterclockwise until it becomes separated from ring 114, then the cutting end of the sawing machine (including gear housing, gears, clutch member 92 and shaft 96 can be separated from the engine and carried as a separate unit. The ring 118 cannot become lost because it will not clear the end of clutch housing 112, instead it will dangle on clutch housing 112 until the sawing machine is fastened together as a unit again. When it is desired to adjust the guide plate and cutting chain to a new position, then ring 118 is turned counter-clockwise until the gear housing 100 and ring 114 are free to rotate relative to clutch housing 112. Then the gear housing is grasped manually and rotated to the desired position (the axis of rotation being the same as the axes of shafts 85 and 96). Then ring 118 is turned clockwise until the end of housing 112 is tightened against shoulder 116, thereby securing the gear housing 100 in its newly adjusted position. Thus it can be seen that we have provided a device which may be used alternatively for separating the sawing machine into two separate sections or for adjusting the cutting chain and associated parts relative to the engine.

In line with our objective to reduce the overall weight of our sawing machine as a unit, we have provided a starting pulley, fan and magneto assembly as a substantially unitary structure Magneto 125 is provided with shoulder portions 126 to which the fan 127 is secured by means of bolts 128. Formed integrally with the fan 127 is a pulley 129 which may be used as an auxiliary starting pulley for starting the engine in event the rewind starter D is not used. A shroud 130 directs the flow of air from fan 127 to the cylinder walls 131 of the engine for cooling same.

Referring to Fig. 4, we have provided a rope type engine starting device with a rewind spring. The starter housing 132 has three legs 133 which abut the main engine casting 134 and are secured thereto by means of bolts 135. A starter rope 136 is wound around pulley 137 and one end of the rope is secured to the pulley and the other end extends through an opening (not shown) in the wall of the starter housing 132 and is secured to a handle 138.

A clock spring 139 is secured at one end to the starter housing 132 by means of a pin 140 threaded into a wall of the starter housing. The other end of spring 139 is secured to hub 141 which is rotatable with starter shaft 142. The mode of operation of the spring 139 in co-operation with starter rope 136 is conventional in the art and is hereinafter described. Secured to the hub portion 143 of fan 127 is an annular ball carrying member 144 which is provided with a plurality of angularly inclined cylindrical recesses 145 in each one of which is a steel ball 146. See Fig. 15. The starter shaft 142 has a threaded end 147, which receives starter member 148 so as to impart rotation thereto. Starter member 148 has a radially outwardly flared end portion 149 which is provided with slots 150 adapted to register with steel balls 146 during the operation of starting the engine. An angularly-inclined disk 151 prevents dirt from getting into slots 150. The operation of the steel balls in co-operation with starter member 148 is conventional. When the engine is at rest, ball carrying member 144 is likewise at rest as it is secured to fan 127 which, in turn, is secured to engine shaft 85. One of the many recesses 145 assumes an upside down position as shown in Fig. 4, causing ball 146 to respond to the action of gravity. As soon as a manual pull is exerted on handle 138, rotation is imparted to starter shaft 142 and starter member 148. Rotation of starter member 148 causes slot 150 to register with recess 145 and steel ball 146, drops into slot 150, thereby establishing driving connection between the starter shaft 142 and engine shaft 85. When the engine starts, balls 146 are thrown into recesses 145 and remain there due to centrifugal force. We have provided starter member 148 with an oil soaked packing 153 which supplies lubricant to sleeve bearing 154. Bearing 154 rotatively supports the free end of engine shaft 85.

An important object of our invention is to provide means for preventing the destructive effects imparted to the starting device, when the engine "backfires." Referring to Fig. 15, I have shown a sectional view of starter member 148 taken on lines 15—15 of Fig. 4. Slot 150 is provided with a ramp portion 156 and a radially extending wall portion 157. When starting the engine, ball 146 is jammed against wall portion 157 and when the engine starts, then the speed of ball carrying member 144 exceeds the speed of starter member 148 and ball 146 rolls up the ramp 156 and centrifugal force carries it up into recess 145 as previously described. However, when the engine backfires, the ball carrying member 144 reverses its direction of rotation and ball 146 becomes jammed against wall 157 causing starter member 148 to be rotated in reverse direction. In order to prevent starter rope 136 and spring 139 from being torn loose from their fastenings, we have provided slipping means for starter shaft 142. Starter shaft 142 is provided with a conical portion 159. A bushing 160 has a conically tapered interior corresponding to the conical portion 159 and is received by a pressed fit in hub 141. A spacer bushing 161 is rotatably and slidably received in bushing 162 which is pressed into hub portion 163 of starter housing 132. Spacer bushing 161 extends beyond the end of hub 141 and engages a spring washer 164 (enlargement of which is shown in Fig. 16). A self locking nut 165 is screwed onto the end of starter shaft 142 until it is flush with the spring washer, permitting a slight axial movement of bushing 161 against the resiliency of spring 164. Normally the tension of spring 164 is great enough to urge bushing 161 and bushing 160 axially so that the frictional engagement between the conical surfaces of shaft portion 159 and bushing 160 is sufficient to establish driving connection between pulley 137 and shaft 142 when starting the engine. In event of backfire, however, this frictional engagement is overcome and the conical portion 159 of shaft 142 slips relative to bushing 160 and shaft 142 and its associated parts are free to rotate relative to bushing 160 and its associated parts, thereby preventing pulley 137 and spring 139 (which are secured to bushing 160 through the medium of hub 141 from being rotated so as to keep the starter rope 136 and spring 139 from being torn loose from their fastenings.

Referring to Figs. 6 to 13, we have shown our driving sprocket E and cutting chain I in detail. The driving sprocket E is made up of the component parts shown in Figs. 8, 9 and 10. Sprocket plates 168 and 169 are identical in size and shape and sprocket plate 170 is formed with a central hub 171 (Fig. 7). Plate 168 fits onto one end of the hub and plate 169 onto the other end so that plate 170 is between them. When the plates 168, 169 and 170 are assembled together to form a unitary sprocket, the teeth on each plate coincide to form a single unitary tooth as shown in Fig. 6. Rivets 172 make the sprocket an integral unit as shown in Figs. 6 and 7.

An important object of our invention is to provide a sprocket tooth which will exert equal driving pressure on each of the teeth which make up the cutting chain, thereby providing a more positive drive on the cutting chain whereby sprocket diameter may be reduced to a minimum and whereby wear and tear on the chain rivets 199 is reduced. To accomplish this, we have provided each sprocket tooth with a driving face having a radius which coincides with the radius of the chain tooth. Thus the radii of the driving faces 175, 176 and 177 coincide with the radii 178, 179 and 180 on the chain teeth. In addition, it will be noted that the notches 181 and 182 which are formed in chain teeth 183 and 184 coincide with the contour of the outer end of the sprocket teeth. Likewise, when chain teeth 82, 183 and 184 are assembled, the radial faces 178, 179 and 180 coincide and have a common axis which is the center of rivet holes 185, 186 and 187. Thus, it can be seen that the sprocket teeth engage each chain tooth simultaneously and with equal driving pressure on each chain tooth.

It will be noted that sprocket plate 170 has recesses 188 which coincide with the contour of the depending tongue 81 of chain tooth 82 and into which the tongues 81 fit while the chain teeth are traveling about the sprocket. Sprocket plates 168 and 169 are provided with a plurality of holes 189 which facilitate the disposal of sawdust while the sawing machine is operating.

Another feature of our invention is to provide a notch 190 in the depending tongue 81 of chain tooth 82. Said notch 190 has a face 191 which is angularly inclined relative to the base of tongue 81 so that when the tongue 81 is riding in the groove 80 in guide plate H, the tip 192 cleans out any sawdust which may tend to become packed into groove 80. The tendency of sawdust to pack in groove 80 is enhanced by the fact that oil from the idling sprocket F becomes mixed with the sawdust and facilitates packing thereof.

It will also be noted that chain teeth 183 and 184 are provided with tits 193 which in turn provide an elongated flat surface 194 for the underneath portions of teeth 183 and 184. These flat surfaces ride on the rim 195 of guide plate H during the time that tongue 81 of chain tooth 82 rides on the bottom of groove 80. The flat surfaces increase the wearing life of the bottom edges of chain teeth 183 and 184.

Fig. 17 shows the sequence of cutting chain I. The cutting chain is made up of five different kinds of teeth, including teeth 82, 183 and 184 heretofore described. Tooth 196 is identical to tooth 183 except that the cutting edge of the tooth is bent oppositely to that of tooth 183. Likewise, tooth 197 is identical to tooth 82 except that their cutting edges are bent in opposite directions. The teeth are fastened together with rivets 199.

Referring to Figs. 7, 7A and 7B, we have shown a modified form of driving connection between the sprocket E and the sprocket shaft 107a. Sprocket shaft 107a is provided with spline slots 200 which mate with the corresponding spline teeth 201 in the interior of hub 171. These teeth and slots preferably extend around the entire circumferences of the shaft 107 and hub 171.

An annular groove 202 is formed in the interior of hub 171. Said groove 202 is comprised of a series of notches 203 formed in each of the spline teeth 201, thereby forming the continuous annular groove 202. A hole drilled radially through the sprocket shaft 107 is provided with a threaded region at one end into which set screw 204 is threaded. A compression spring 205 abutted by one end of set screw 204 urges steel ball 206 radially outwardly at all times so that part of the ball protrudes beyond the exterior surface of the spline slot 200 and drops into one of the notches 203 thereby locking the sprocket E onto the sprocket shaft 107. It will be noted that the area in slot 200 adjacent the ball 206 is peened slightly so that the ball cannot drop out when sprocket E is removed from the sprocket shaft. It will also be noted that the width of notches 203 is greater than the diameter of ball 206, thereby permitting the sprocket E to move axially relative to sprocket shaft 107. This is an important feature of our invention, since this makes sprocket E self-aligning with groove 80 in guide plate H, thereby eliminating the necessity of accurate machining and accurate assembling of sprocket shaft 107 within gear housing 100. By referring to Figures 3 and 6, it can be seen how sprocket E is aligned with guide plate H in a common plane so that cutting chain I can travel in a single plane.

Having thus described our invention, what we claim is:

1. A chain saw machine comprising a power unit, a chain guiding plate extending therefrom, a cutting chain, a combination chain lubricating and chain tensioning device secured to the end of the guiding plate opposite the power unit, said device including a lubricant chamber, a sleeve portion extending from one end wall of said chamber, a second sleeve screw-threadedly engaging said sleeve portion so as to be adjustable relative thereto, said second sleeve being rotatably supported within said device, a third sleeve disposed within the second sleeve so as to be rotatable and slidable relative thereto, a plunger within said lubricant chamber, said second sleeve serving to retract said plunger for refilling the lubricant chamber and said third sleeve serving to adjust the tension of the cutting chain.

2. A chain saw machine comprising a power unit, a chain guiding plate extending therefrom, a cutting chain trained about said guiding plate, a combination chain lubricating and chain tensioning device disposed at the end of the guiding plate opposite the power unit, said device including a lubricant chamber, a sleeve portion extending from one end wall of said chamber, a second sleeve screw-threadedly engaging said sleeve portion so as to be adjustable relative thereto, said second sleeve being rotatably and slidably supported within said device, a third sleeve disposed within said second sleeve so as to be rotatable and slidable relative thereto, a sprocket supporting rod received within said third sleeve so as to be adjustable relative thereto, a plunger within said lubricant chamber, said second sleeve serving to retract said plunger for refilling said lubricant chamber and said third sleeve serving to retract said sprocket support rod whereby to adjust the tension of the cutting chain.

3. A chain saw machine comprising a power unit, a chain guiding member extending therefrom, a cutting chain trained about said guiding member, a support member secured to an end of the chain guiding member, a hollow sprocket shaft, an idling sprocket carried by the sprocket shaft, means associated with the support member for lubricating the cutting chain, said means including a lubricant chamber, a spring-pressed plunger therein for maintaining constant pressure behind the lubricant, a flexible lubricant conduit leading from the chamber to the sprocket shaft, an oil passage leading through the sprocket shaft and opening into the periphery of the sprocket and means associated with the sprocket shaft for substantially cutting off the flow of lubricant to the cutting chain when the chain saw machine is not operating, said means including a threaded nipple rotatable within the hollow sprocket shaft.

4. A chain saw machine comprising a power unit, a chain guiding member extending therefrom, a driving sprocket at one end of the chain guiding member, a driven sprocket at the other end of the chain guiding member, a cutting chain trained about the sprockets and chain guiding member, a support member secured to the chain guiding member, said support member having a slot therein, a sprocket shaft extending through the slot, a rod carrying said sprocket shaft, a wall portion on said support member, an opening in said wall portion, the rod extending through said opening, a sleeve extending from the wall portion, a second sleeve slidably and rotatably journaled in the first sleeve, said second sleeve screw-threadedly engaging the rod, a spring surrounding the rod and being interposed between the wall portion and one end of the second sleeve, and a third sleeve surrounding the first and second sleeves and being screw-threaded onto the first sleeve.

5. A chain saw machine as described in claim 4 wherein a stationary hollow handle receives within its interior the third sleeve said third sleeve being rotatably and axially movable relative to the handle.

6. A chain saw machine comprising a power unit, a cutting chain driven thereby, a guide member for said cutting chain, a sprocket shaft having driving connection with the power unit, a sprocket mounted on the sprocket shaft, a hub for said sprocket, the interior surface of said hub being serrated axially, the sprocket shaft having corresponding axial serrations whereby the sprocket hub and sprocket are movable axially of the sprocket shaft but are not rotatable relative thereto, means within the sprocket shaft for limiting the axial movement of the hub and sprocket relative to the sprocket shaft and also for preventing the hub and sprocket from becoming disconnected from the shaft.

7. A chain saw machine comprising a power unit, a cutting chain driven thereby, a guide member for said chain, a shaft, a sprocket mounted on said shaft and being axially movable thereon, means on said shaft for effecting rotative movement of the shaft and sprocket as a unit and means within said shaft and sprocket for limiting the amount of axial movement of the sprocket relative to the shaft, said last means normally serving to prevent the sprocket from becoming disconnected from the shaft and said last means including an annular groove in the sprocket and a constantly spring-pressed ball mounted in the shaft and protruding into the groove.

ARTHUR W. MALL.
WALTER L. GORDEN.